ID

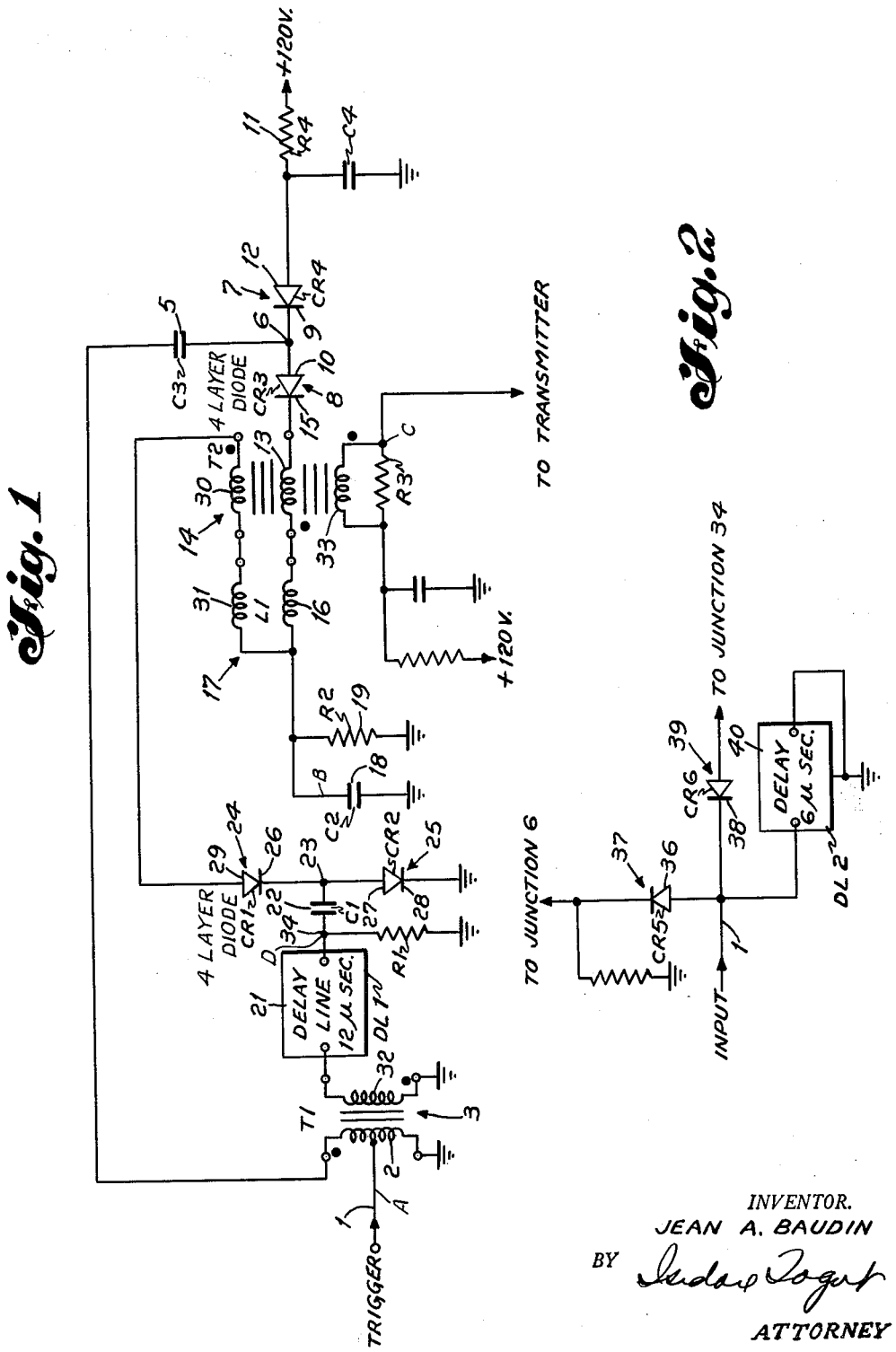

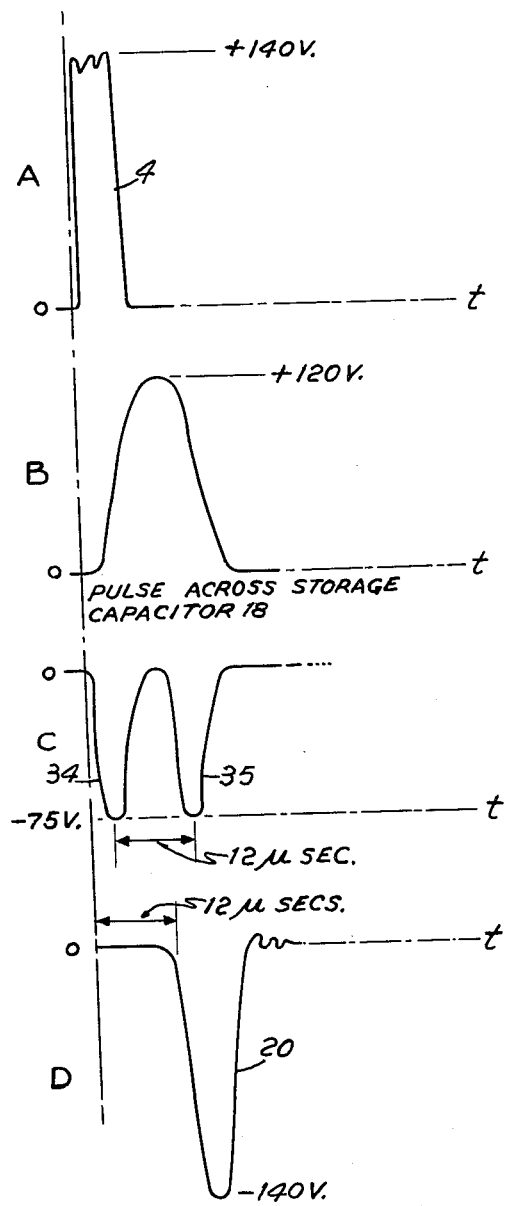

United States Patent Office 3,053,999
Patented Sept. 11, 1962

3,053,999
PULSE MODULATOR CIRCUIT FOR GENERATING PAIRED PULSES
Jean A. Baudin, Montclair, N.J., assignor to International Telephone and Telegraph Corporation, Nutley, N.J., a corporation of Maryland
Filed July 5, 1960, Ser. No. 40,832
11 Claims. (Cl. 307—88.5)

This invention relates to a pulse modulator and more particularly to a pulse modulator for generating paired pulses.

In certain signalling systems, pulses are transmitted in pairs having a fixed time spacing. Such pairs of pulses are employed instead of single pulses since the paired pulses may be distinguished from isolated single pulses or groups of pulses having other than the prescribed spacing. The selection of the desired pulses and rejection of the undesired pulses may be accomplished by a decoder and a receiver for such systems. One system using pulse pairs is the aerial navigation system, "Tacan." This system includes a beacon transmitter and mobile station receivers, such as for example, those carried on airplanes. In this system, there is transmitted several different types of pulse signals in pairs. For bearing determination, a north signal is produced by spacing a series of successive pairs of pulses a predetermined interval apart, such as for example, 18 microseconds, the spacing between the pulses of each pair remaining the same as for the rest of the transmission, 12 microseconds. That is, each pulse of each pair is separated from the other by 12 microseconds. Heretofore, complicated and expensive circuitry has been required to generate such pulse pairs. Furthermore, in the prior art, the recovery of the circuit to the original state in preparation for the generation of the next pulse pair has not been as sharp as is required for optimum operation of the system. The problem is particularly acute in airborne equipment.

An object of this invention is to provide a novel pulse modulator for generating pairs of pulses having substantially simple and inexpensive circuitry.

Another object is to provide a circuit having a substantially fast recovery time.

A feature of this invention is a pulse modulator for producing a pair of pulses separated by a predetermined time interval comprising an input trigger signal of a given polarity, a capacitor and a charging current. A first gating means which includes a pair of diodes series connected and to which is connected the trigger signal of given polarity couples the charging voltage to the capacitor through a pulse transformer. Upon the application of the trigger signal of the given polarity, the diode conducts and permits the charging current to flow through to charge the capacitor. As the capacitor charges, a pulse is induced in the output winding of a pulse transformer. When the potential on the capacitor reaches the maximum value of the charging current, the current decreases and reverses and thus places the diode in the non-conducting or "off" state. The charge on the capacitor can thus be held for any predetermined time. The input trigger signal is inverted and delayed for a time equal to the time interval between the pulses and is then coupled to a second group of two diodes coupled in series, one of said diodes being coupled to ground and the other diode being coupled to the capacitor through another winding of the pulse transformer. Upon the application of the inverted trigger signal to the second group of diodes, the other diode of this group conducts and thereby permits the charge on the condenser to flow through the second group of diodes to ground thereby discharging the condenser and inducing a second pulse in the output winding of a pulse transformer a predetermined time after the first pulse.

The above-mentioned and other features and objects of this invention will become more apparent by reference to the following description taken in conjunction with the accompanying drawings, in which:

FIG. 1 is a schematic diagram of an embodiment of this invention;

FIG. 2 is an alternate embodiment of a portion of this invention; and

FIG. 3 is a group of waveforms useful in describing the operation of this invention.

This invention takes advantage of the properties of the four layer silicon diode avalanche. The semiconductor used in the circuit of this invention is the 4J200M–5 which has a breakdown voltage of 200 volts and a peak current capability of 20 amperes. Basically, the 4J200M–5 is a two terminal device operating as a switch and is always in one of two states: (1) an "open" or low conductance state of 10 to 1,000 megohms in parallel with about 50 micromicrofarads, and (2) a "closed" or high conductance state of 0.2 to 1.0 ohm, the resistance depending on the current flowing. The diode is switched from one state to the other by controlling the current and voltage applied. When the voltage exceeds the breakdown level, the diode changes from "open" to "closed." When the current drops below a threshold value (which will occur if the diode is used to discharge a capacitor), the diode will switch back to "open."

Referring now to FIGS. 1 and 3, there is shown an input trigger signal 1 applied to the primary 2 of a transformer 3. The input trigger signal or pulse is of positive polarity as denoted by the pulse 4 of waveform A in FIG. 3. This trigger pulse 4 passes through the primary 2 of the input transformer 3 in the positive state and is applied via capacitor 5 to the junction 6 of diodes 7 and 8. The cathode 9 of diode 7 is coupled to the anode 10 of four layer diode 8. A charging current having a maximum potential of +120 volts is applied to the anode 12 of diode 7. A first winding 13 of a pulse transformer 14 couples the cathode 15 of diode 8 to a first winding 16 of a shaping coil 17. The other end of the winding 16 is coupled to one plate of a capacitor 18 and a resistor 19, the other connections of the capacitor 18 and resistor 19 being made to ground. The input trigger pulse 4 is inverted by transformer 3 and becomes a pulse of opposite polarity 20, as shown in graph D, and is coupled to a delay line 21 having a time delay equal to the requisite delay between the pulse pairs, in this case for illustration, 12 microseconds. The inverted delayed trigger pulse 20 is coupled via capacitor 22 to the junction 23 of two diodes 24 and 25, the cathode 26 of four layer diode 24 being coupled to the anode 27 of diode 25. Cathode 28 of diode 25 is coupled to ground and anode 29 of diode 24 is coupled to a third winding 30 of pulse transformer 14. The other end of winding 30 is coupled to a second winding 31 of shaping coil 17 and the other end of winding 18 is coupled to capacitor 18.

Basically, in my invention a pulse forming network is charged through a pulse transformer and then discharged by a second path from the latter through a second winding on the same pulse transformer. A third winding on the pulse transformer then would have a pair of pulses across its terminals, one obtained from the charging current and one obtained from the discharging current. In this invention, the input transformer 3 is energized by the trigger pulse 1 at its input and produces two outputs: the primary of this transformer by auto-transformer action produces a 140 volt positive pulse 4; the secondary 32 produces a 140 volt negative pulse 20. The positive pulse 4 is fed at junction 6 to the anode 10 of diode 8. Since capacitor 18 is fully discharged initially, the cathode 15 of diode 8 is at zero potential and the trigger pulse 4 therefore appears across this diode 8 in series with the +120 volt power supply. The diode 7 prevents loading the trigger with the power supply. The presence of the trigger pulse 4 on the diode 8 causes four layer diode 8 to "close" and the charging current from the power supply surges through winding 13 of pulse transformer 14, winding 16 of shaping coil 17 and into capacitor 18. When the potential of capacitor 18 rises to the +120 volt value, as shown in graph B, the current in this path decreases and reverses until four layer diode 8 is switched to the "open" state. At this point, capacitor 18 is fully charged and can maintain this charge virtually unchanged for 20 microseconds or more. As a result of this charging current, a shaped pulse appears at the output of winding 33 of pulse transformer 17. This shaped pulse is pulse 34, shown in graph C, and has a potential of −75 volts, this particular value depends on the winding ratio of transformer 14.

In a similar manner, the four layer diode 24 is used to discharge capacitor 18, 12 microseconds later. The action is as follows: The negative output of transformer 3 is passed through delay line 24 which provides a 12-microsecond delay to the negative trigger pulse 20. This delayed pulse 20 triggers four layer diode 24 into the "closed" state thus discharging capacitor 18 through winding 31 of shaping coil 17, through winding 30 of pulse transformer 14 and through diode 25 to ground. The discharge is complete and once again capacitor 18 is at zero potential and the full cycle is ready to repeat. As capacitor 18 discharges, the discharge through the pulse transformer winding 30 produces the second pulse 35 at the output of winding 33 of pulse transformer 14. Resistor 19 maintains the voltage of capacitor 18 at zero when the trigger is off.

In order to prevent accidental triggering of four layer diode 24 during the firing of four layer diode 8 and vice versa, coupling between the windings of the shaping coil 17 is made such that a suppression pulse is made to appear across the non-conducting diode from the surge current of the conducting diode. This is accomplished by coupling shaping coil 31 and shaping coil 16. This then makes it impossible to fire both diodes simultaneously. The twin pulses 34 and 35 appearing across the output winding 33 of the pulse transformer 14 are then applied to the cathodes of an RF pulse amplifier (not shown) to achieve pulse modulation of the transmitter.

Due to the fast recovery time of the basic circuit, the pulse repetition rate is only limited by the power handling capacity of the components in the circuit. This characteristic makes it possible to externally modulate a Tacan transmitter (not shown) without materially effecting the normal range function.

An alternative embodiment of that portion of the circuit of FIG. 1 used to invert the trigger pulse, that is, the input transformer 3, is shown in FIG. 2. The input trigger pulse is applied to the anode 36 of a diode 37, the cathode 38 of a diode 39 and to a 6 microsecond delay line 40 of the reflection type. The positive input pulse 4 is passed through the diode 37 to junction 6 of diodes 7 and 8. The input pulse 4 also passes to the delay line 40, is reflected back and reverses polarity in its return path, becoming the negative trigger pulse 20, and passes through diode 39 to delay line 21.

This invention has been successfully reduced to practice with the following parameters.

Capacitors:
    C1 _____ 320 μμf.
    C2 _____ .82 μf.
    C3 _____ 270 μμf.
    C4 _____ 25 μf.
Diodes:
    CR1 _____ 4J200M–5 (4 layer).
    CR2 _____ IN679.
    CR3 _____ 4J200M–5 (4 layer).
    CR4 _____ IN679.
    CR5 _____ IN459.
    CR6 _____ IN459.
Delay line: DL1 _____ High impedance, 9100 ohms, 12 μsec. delay.
Resistors:
    R1 _____ 9100 ohms.
    R2 _____ 15000 ohms.
    R3 _____ 18 ohms, 1 watt WW.
    R4 _____ 100 ohms, 1 watt WW.
Shaping coil: L1 _____ 2×4 microhenries.
Pulse transformers:
    T1 _____ Split primary.
    T2—
        Primary _____ 4 ohms impedance.
        Primary _____ 4 ohms impedance.
        Secondary _____ 16 ohms impedance.
B+ _____ 120 volts.
Pulse repetition frequency _____ 30 or 150 c.p.s.

It is possible to replace the junction diodes CR5 and CR6 by four layer diodes. This arrangement has the advantage of permitting use of four layer diodes of smaller breakdown voltages. When higher voltages are necessary a series arrangement, of several four layer diodes is employed.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pulse modulator for producing a pair of pulses separated by a predetermined time interval comprising an input signal, a capacitor, means responsive to said input signal to charge said capacitor, means to derive a first pulse from said charging of said capacitor, means to delay said input signal means responsive to said delayed input signal to discharge said capacitor and means to derive a second pulse from said discharging of said capacitor at said predetermined time after said first pulse.

2. A pulse modulator for producing a pair of pulses separated by a predetermined time interval comprising an input signal of a given polarity, a capacitor, means responsive to said input signal of given polarity to charge said capacitor, means to derive a first pulse from said charging of said capacitor, means to delay said input signal means responsive to said delayed input signal of opposite polarity to discharge said capacitor and means to derive a second pulse from said discharging of said capacitor at said predetermined time after said first pulse.

3. A pulse modulator for producing a pair of pulses separated by a predetermined time interval comprising a trigger signal of a given polarity, a capacitor, a source of charging signal, first gating means responsive to said trigger signal of given polarity to control the application of said charging signal to said capacitor to charge said capacitor, means to derive a first pulse from said charging of said capacitor, means to delay said trigger signal second gating means responsive to said delayed trigger signal of opposite polarity to discharge said capacitor and means responsive to said discharge of said capacitor to derive a second pulse at said predetermined time after said first pulse.

4. A pulse modulator according to claim 3 wherein said first gating means includes first and second diodes, means coupling the cathode of said first diode to the anode of said second diode, means coupling said source of charging voltage to the anode of said first diode, means coupling said trigger voltage of given polarity to the junction of said first and second diodes and means coupling the cathode of said second diode to said capacitor.

5. A pulse modulator according to claim 3 further comprising means to invert said trigger signal of given polarity to said trigger signal of opposite polarity, said second gating means including third and fourth diodes, means coupling the cathode of said third diode to the anode of said fourth diode, means coupling the cathode of said fourth diode to ground, delay means coupling said trigger signal of opposite polarity to the junction of said third and fourth diodes and means coupling the anode of said third diode to said capacitor.

6. A pulse modulator for producing a pair of pulses separated by a predetermined time interval comprising a trigger signal of a given polarity, means to invert said trigger signal of given polarity to a trigger signal of opposite polarity, a source of charging signal, a pulse transformer, first means coupling said trigger signal of given polarity and said charging signal to said pulse transformer, a capacitor, means coupling said capacitor to said pulse transformer whereby when said trigger signal of said given polarity appears at said first coupling means said pulse transformer transmits said charging signal therethrough to charge said capacitor and a first pulse is produced at the output of said pulse transformer, second means coupling said trigger signal of opposite polarity to said pulse transformer whereby the application of said trigger signal of opposite polarity to said second coupling means permits the charge on said capacitor to be discharged through said pulse transformer and produces a second pulse at the output of said pulse transformer at a predetermined time after said first pulse.

7. A pulse modulator for producing a pair of pulses separated by a predetermined time interval comprising a trigger signal of a given polarity, means to invert said trigger signal of given polarity to a trigger signal of opposite polarity, first gating means, a source of charging signal, means coupling said source of charging signal to first gating means, means coupling said trigger signal of given polarity to said first gating means, a pulse transformer, a capacitor, means coupling said capacitor to said pulse transformer, means coupling said source of charging signal and said trigger signal to said pulse transformer whereby when said trigger signal of said given polarity appears said pulse transformer transmits said charging signal therethrough to charge said capacitor and a first pulse is produced at the output of said pulse transformer during the charging of said capacitor, second gating means, delay means coupling said trigger signal of opposite polarity to said second gating means, means coupling the output of said second gating means to said pulse transformer, whereby the application of said trigger signal of opposite polarity to said second gating means causes the charge on said capacitor to be discharged through said pulse transformer and produces a second pulse at the output of said pulse transformer at said predetermined time after said first pulse.

8. A pulse modulator for producing a pair of pulses separated by a predetermined time interval comprising a trigger signal of a given polarity, means to invert said trigger signal of given polarity to a trigger signal of opposite polarity, first gating means, a source of charging signal, means coupling said source of charging signal to said first gating means, means coupling said trigger signal of given polarity to said gating means, a pulse transformer having first and second input windings, a capacitor, means coupling said first input winding of said pulse transformer to said capacitor, means coupling said first input winding to said first gating means, whereby when said trigger signal of said given polarity appears at said first gating means said first gating means is placed in the conductive state and transmits said charging signal therethrough to charge said capacitor and a first output pulse is induced in said output winding of said pulse transformer, said first gating means becoming non-conductive when said capacitor is charged to the maximum potential value of said charging signal, second gating means, delay means having a time delay equal to said predetermined time coupling said trigger signal of opposite polarity to said second gating means, means coupling said second input winding of said pulse transformer to said capacitor, means coupling said second input winding to said second gating means to said capacitor whereby the application of said trigger signal of opposite polarity to said second gating means causes said second gating means to become conductive and thereby permits the charge on said capacitor to be discharged through said second gating means and produces a second output pulse across said output winding of said pulse transformer at a predetermined time after said first output pulse.

9. A pulse modulator for producing a pair of pulses separated by a predetermined time interval comprising a trigger signal of a given polarity, means to invert said trigger signal of given polarity to a trigger signal of opposite polarity, first gating means, a source of charging signal, means coupling said source of charging signal to said gating means, means coupling said trigger signal of given polarity to said gating means, a pulse transformer having first and second input windings, inductance means having first and second windings, a capacitor, said first input winding of said pulse transformer and said first winding of said inductance means series coupling said first gating means to said capacitor whereby when said trigger signal of said given polarity appears at said first gating means, said first gating means is placed in the conductive state and transmits said charging signal therethrough to charge said capacitor and a first output pulse is induced in said output winding of said pulse transformer, said first gating means becoming non-conductive when said capacitor is charged to the maximum potential value of said charging signal, second gating means, delay means having a time delay equal to said predetermined time coupling said trigger signal of opposite polarity to said second gating means, said second input winding of said pulse transformer and said second winding af said inductance means being in series connection and coupling said second gating means to said capacitor whereby the application of said trigger signal opposite polarity to said second gating means causes said second gating means to become conductive and thereby permits the charge on said capacitor to be discharged through said second gating means and produces a second output pulse across said output winding of said pulse transformer at said predetermined time after said first output pulse.

10. A pulse modulator for producing a pair of pulses separated by a predetermined time interval comprising a trigger signal of a given polarity, means to invert said trigger signal of given polarity to a trigger signal of opposite polarity, first and second diodes, means coupling the cathode of said first diode to the anode of said second diode, a source of charging signal, means coupling said source of charging signal to the anode of said first diode, means coupling said trigger signal of given polarity to the junction of said first and second diodes, a pulse transformer having first and second input windings and an output winding inductance means having first and second windings, a capacitor, said first input winding of said pulse transformer and said first winding of said inductance means series coupling said cathode of said second diode to said capacitor whereby when said trigger signal of said given polarity appears at said junction of said first and second diodes said second diode is placed in the conductive state and transmits said charging signal therethrough to charge said capacitor and a first output pulse is induced in said output winding of said pulse transformer, said second diode becoming non-conductive when said capacitor is charged to the maximum potential value of said charging signal, gating means, delay means having a time delay equal to said predetermined time coupling said trigger signal of opposite polarity to said gating means, said second input winding of said pulse transformer and said second winding of said inductance means being in series connection and coupling said gating means to said capacitor whereby the application of said trigger signal of opposite polarity to said gating means causes said gating means to become conductive and thereby permits the charge on said capacitor to be discharged through said gating means and produces a second output pulse across said second winding of said pulse transformer at said predetermined time after said first output pulse.

11. A pulse modulator for producing a pair of pulses separated by a predetermined time interval comprising a trigger signal of a given polarity, means to invert said trigger signal of given polarity to a trigger signal of opposite polarity, first and second diodes, means coupling the cathode of said first diode to the anode of said second diode, a source of charging signal, means coupling said source of charging signal to the anode of said first diode, means coupling said trigger signal of given polarity to the junction of said first and second diodes, a pulse transformer having first and second input windings, and an output winding inductance means having first and second windings, a capacitor, said first input winding of said pulse transformer and said first winding of said inductance means series coupling said cathode of said second diode to said capacitor whereby when said trigger signal of said given polarity appears at said junction of said first and second diodes said second diode is placed in the conductive state and transmits said charging signal therethrough to charge said capacitor and a first output pulse is induced in said output winding of said pulse transformer, said second diode becoming non-conductive when said capacitor is charged to the maximum potential value of said charging signal, third and fourth diodes, means coupling the cathode of said third diode to the anode of said fourth diode, means coupling the cathode of said fourth diode to ground, delay means having a time delay equal to said predetermined time interval coupling said trigger signal of opposite polarity to the junction of said third and fourth diodes, said second input winding of said pulse transformer and said second winding of said inductance means series coupling the anode of said third diode to said capacitor whereby the application of said trigger signal of opposite polarity to the cathode of said third diode causes said third diode to become conductive and thereby permits the charge on said capacitor to be discharged through said third and fourth diodes to ground and produces a second output pulse across said second winding of said pulse transformer at said predetermined time after said first output pulse.

References Cited in the file of this patent

UNITED STATES PATENTS

| | | |
|---|---|---|
| 2,632,847 | Reed | Mar. 23, 1953 |
| 2,854,590 | Wolfe | Sept. 30, 1958 |
| 2,899,553 | Horton | Aug. 11, 1959 |
| 2,949,547 | Zimmerman | Aug. 16, 1960 |